US006615673B1

(12) United States Patent
Cullie

(10) Patent No.: US 6,615,673 B1
(45) Date of Patent: Sep. 9, 2003

(54) INTEGRAL SHEDDER AND MOUNTING PAD

(75) Inventor: Eugene C. Cullie, Franklin, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/625,390

(22) Filed: Jul. 26, 2000

Related U.S. Application Data

(60) Provisional application No. 60/145,676, filed on Jul. 26, 1999.

(51) Int. Cl.⁷ .................................................. G01F 1/32
(52) U.S. Cl. .................................. 73/861.22; 73/861.21
(58) Field of Search .......................... 73/861.22, 861.21

(56) References Cited

U.S. PATENT DOCUMENTS

| | | | | |
|---|---|---|---|---|
| 4,220,046 A | * | 9/1980 | Sqourakes | ................ 73/861.22 |
| 5,123,285 A | * | 6/1992 | Lew | ......................... 73/861.22 |
| 5,753,826 A | * | 5/1998 | Kashimura et al. | ............ 285/49 |
| 6,351,999 B1 | * | 3/2002 | Maul et al. | ............... 73/861.22 |

* cited by examiner

*Primary Examiner*—Edward Lefkowitz
*Assistant Examiner*—Corey D. Mack
(74) *Attorney, Agent, or Firm*—Kevin A. Oliver; Foley Hoag LLP

(57) ABSTRACT

A vortex flow meter has a vortex shedder that spans a diameter or other chord of a fluid-guiding pipe, and protrudes partially externally through two opposed openings in the pipe wall. The vortex shedder includes two spaced-apart mounting pads and an elongate portion spanning therebetween. At least one mounting pad includes a cavity for seating a sensor. One preferred practice of the invention inserts the shedder through the openings into the fluid-guiding pipe such that the elongate section resides within the flowing fluid and produces a stream of space-apart vortices, and the mounting pads protrude at least partially through the openings. The sensor produces electrical signals in response to the induced vortices, and an electronic module receives the electrical signals and calculates the flow velocity of the fluid based on the frequency of the electrical signals.

18 Claims, 14 Drawing Sheets

INTEGRAL SHEDDER AND MOUNTING PAD

REFERENCE TO RELATED APPLICATIONS

This application claims priority from U.S. provisional application Ser. No. 60/145,676, filed Jul. 26. 1999, the contents of which are incorporated by reference herein.

BACKGROUND

This invention relates generally to apparatus and methods for measuring flow rates of fluids. In particular, the invention relates to an improved vortex flowmeter for measuring flow velocity of fluids.

Vortex flowmeters typically have a tubular passage, such as a pipe, for guiding a flowing fluid, herein referred to as process fluid, and have an obstruction element, also termed a vortex shedder, interposed in the path of the flowing fluid. The obstruction element includes a blunt surface facing the fluid flow for creating a series of spaced vortices downstream in the flowing fluid and includes a "tail" section for stabilizing the vortices. Under certain conditions, the vortex shedder creates two nearly-parallel rows of vortices on opposite sides of the shedder. These vortices are known as a Van Karman vortex street. The vortices in one row are staggered with respect to the vortices in the other row. It is understood that the frequency of these generated vortices is linearly proportional to the average flow velocity of the fluid. Thus, a measurement of the frequency of the vortices provides a measure of the average flow velocity of the fluid. A vortex-responsive sensor detects the pressure fluctuations associated with the passage of the vortices and drives an electronic unit that determines the frequency of the vortices, to determine the flow velocity of the fluid.

Vortex shedders of some conventional flowmeters are integrally cast as one unit with the pipe within which the shedder resides. As the size of the vortex shedder increases, or at very small sizes, such integral casting process is not practical. Thus, in many conventional flowmeters, the pipe and the vortex shedder are manufactured separately, and subsequently assembled together. The manufacture of such a conventional vortex flow meter typically consists of providing a pipe that is machined to accommodate a separate mounting plate, and to include a small locating hole diametrically opposed to the mounting pad for precise positioning of a shedder. In many conventional vortex flowmeters, the obstruction element spans the entire inner diameter of the pipe that contains the process fluid. The manufacturing process typically produces the shedder through precision casting. The cast shedder has curved ends having radii that are machined to conform with the inner curvature of the pipe. The machined shedder typically includes a locating hole on one end and a recess adjacent the other end for accommodating a sensor.

The assembly of such a shedder within the pipe includes the steps of aligning the radial extension of the shedder within the pipe by placing the locating hole of the shedder in register with the locating hole of the pipe, and inserting in the registered holes a set screw or like pin members to maintain the alignment of the shedder. The shedder is then welded to the inner surface of the pipe along both of its curved ends. The mounting plate is located precisely over the shedder and welded in place.

Such conventional flowmeter construction suffers from a number of drawbacks. In particular, the locating steps for alignment purposes can be time-consuming and costly. Further, any flaw in the alignment steps can adversely affect the flowmeter operation. For example, slight changes in the alignment of the shedder within the pipe can adversely impact the linearity of the flow meter. Another disadvantage of the conventional construction is that the process of producing curved ends for the shedder, especially for large shedders that fit within pipes having inner diameters of approximately 6 inches (15 cm) or larger, is cumbersome and timeconsuming.

Shedders are typically dimensioned such that they are not in intimate contact with the inside of the pipe before welding. A weld material, applied around the perimeter of each end of the shedder to within approximately a fraction of an inch of the blunt surface and the tail section of the shedder, holds the shedder in place. The resulting gaps between the blunt surface and the pipe, and between the tail portion and the pipe are spanned by small tack welds. Such tack welds are susceptible to failures, for example due to mechanical stress, that loosen the shedder with a concomitant loss of accuracy.

Another conventional vortex flowmeter structure accommodates thermal expansion of the shedder within the pipe by providing gaps between the wall of the fluid-guiding pipe and the shedder. Nevertheless, thermal expansion of the shedder in such vortex flowmeters can lead to weld cracking, and concomitant loosening of the shedder.

Another disadvantage of conventional designs is that separate shedders are required for pipes having different sizes. For example, the pressure of the flowing fluid can vary from one application to another. As the application pressure increases, the thickness of the wall of the pipe for guiding the fluid needs to increase to accommodate the increased pressure. Industry standards typically hold the outer diameter ("OD") of the pipe constant, and adjust the inner diameter ("ID") in order to change the wall thickness. The change in the ID necessitates a different shedder, having a different length, to fit within the pipe.

It is thus an object of the invention to provide a vortex flowmeter that is less costly to manufacture than conventional flowmeters of comparable performance.

It is another object of the invention to provide a vortex shedder that is adaptable to a number of flowtube sizes.

It is another object of the invention to provide a flow meter that is less susceptible to loosening of the shedder as a result of mechanical and/or thermal stress.

It is a further object of the invention to provide a vortex flowmeter that can be configured for use with different types of fluids.

Other general and specific objects of this invention will in part be obvious and in part be evident from the drawings and description which follow.

SUMMARY OF THE INVENTION

The invention attains the foregoing and other objects by providing an improved vortex-sensing apparatus for measuring flow velocity of a fluid. The flowmeter of the invention includes a conduit having a wall that forms a passage for guiding the fluid. The wall includes two opposed openings that allow passage of a vortex-creating obstruction element therethrough. The opposed openings can be positioned along any chord of the pipe cross section. A preferred embodiment places the opposed openings along a central chord, i.e., diameter of the pipe. For illustration purposes, the embodiments of the invention are described herein by reference to diametrically opposed openings. The obstruction element includes an elongate portion, and two mounting pads, each of which is integrally connected to a different end of the elongate portion. The opposed openings allow insertion of the obstruction element into the passage such that each mounting pad partially protrudes externally of the pipe, through the openings. The flow of the process fluid past the obstruction element produces two streams of spaced vortices, with the vortices in one stream staggered or spatially offset with respect to those in the other stream. A sensor element detects the vortices, thereby measuring the flow velocity of the fluid.

One preferred practice of the invention bevels both pipe openings, or otherwise prepares the areas to be welded for accepting the weld deposit, externally to allow a full penetration weld of the obstruction element to the outside surface of the wall of the conduit. The welding of the shedder externally to the conduit maintains the rigid disposition of the shedder within the passage. In addition, the full penetration weld of the shedder to the pipe creates a pressure-tight attachment of the shedder to the pipe, and structurally reinforces the pipe against internal pressure.

As is conventional, in a vortex flowmeter for practice of the invention, the elongate portion of the shedder includes a blunt surface, and a tail portion. The disposition of the shedder within the passage is preferably such that the blunt surface faces the flowing fluid, and partially obstructs the flow of the fluid. The partial obstruction of the flow induces vortices in the fluid. If the flow velocity exceeds a certain threshold, the induced vortices detach from the shedder and move downstream. Because the frequency of the vortices is proportional to the flow velocity of the fluid, a measurement of the frequency of the vortices can determine the flow velocity of the fluid. The tail portion is understood to stabilize formation of the vortices, and hence increase the accuracy of the flow velocity measurement.

Another aspect of the invention relates to manufacturing the vortex shedder as an integral unit by a precision casting process known in the art. The cast shedder includes an elongate portion having a blunt surface, a tail portion, and two mounting pads integrally joined to the elongate portion. The cast shedder typically requires machining of at least one of the mounting pads, to form a cavity or like recess for seating a sensor. One preferred embodiment provides at least one of the mounting pads of the vortex shedder with threaded holes for attaching other structures, such as a structure for dampening vibrations, to the shedder.

In one preferred embodiment of the invention, the two pads of the shedder are recessed to provide housings for two sensors. Such a shedder structure, herein referred to as a "double-ended" structure, allows mounting of two separate electronic modules for a "dual-meter" arrangement. Such a double-ended structure provides certain advantages including measuring flow rates of different types of fluids, such as liquid and steam, with a single flow meter. This and other advantages of a double-ended structure are described in more detail below.

In another embodiment, only one mounting pad of the shedder houses a sensor, and the other end of the shedder protrudes externally through one opening in the wall of the fluid-guiding conduit, and extends outwardly beyond the conduit wall. The protruding portion of the shedder can advantageously serve as a platform for stably resting the flowmeter on a flat surface, thus facilitating assembly, fixturing, and/or other handling of the flowmeter.

One preferred practice of the invention optionally provides structures, such as tapped holes, at least one end of the shedder for adding structures for dampening vibrations of the flowmeter and/or for providing additional structural support to the flowmeter. Such structures are particularly useful for dampening vibrations where piping systems to which the flowmeter is attached have excessive vibrations. The addition of such structures to the shedder of the present invention provides distinct advantages over conventional flowmeters that typically rely on external pipe supports to minimize vibrational effects.

In a preferred embodiment of the flowmeter of the invention, the two mounting pads at the opposite ends of the shedder have similar diameters to balance pressure forces acting on the shedder. In another embodiment, the two radially opposed openings in the wall of the passage guiding the process fluid are selected to have two different sizes. Such a difference in diameters of the openings allows insertion of a shedder, in which one mounting pad is smaller than the other and has a stepped or otherwise tapered periphery, into the passage. For example, one mounting pad can have a stepped diameter that includes two portions, both of which pass through one of the openings, but only one of which passes through the other opening. Thus, the stepped diameter provides a built-in stop that ensures proper positioning of the elongate portion of the shedder within the passage.

The mounting pads at the opposite ends of a shedder according to the present invention can have a variety of different cross-sectional geometries. For example, while some embodiments of the invention include mounting pads having circular cross-sections, other alternative embodiments include mounting pads with square cross-sections. Employing mounting pads having square or rectangular cross-sections can advantageously simplify the manufacturing of the shedder. For example, a surface of a square or rectangular bar can be selected to provide a contiguous surface including the blunt face of the shedder and a surface of each mounting pad, thereby facilitating production of the shedder.

The shedder of the invention can be installed in pipes have a variety of different inner diameters without machining of the shedder to size it for a particular pipe size. Thus, the present invention results in considerable savings of time and of labor in attaining flowmeters suited for a variety of applications.

These and other features of the invention are more fully set forth below with reference to the detailed description of illustrated embodiments, and the accompanying figures in which like numerals refer to like elements.

DESCRIPTION OF ILLUSTRATED EMBODIMENTS

Figure 1:
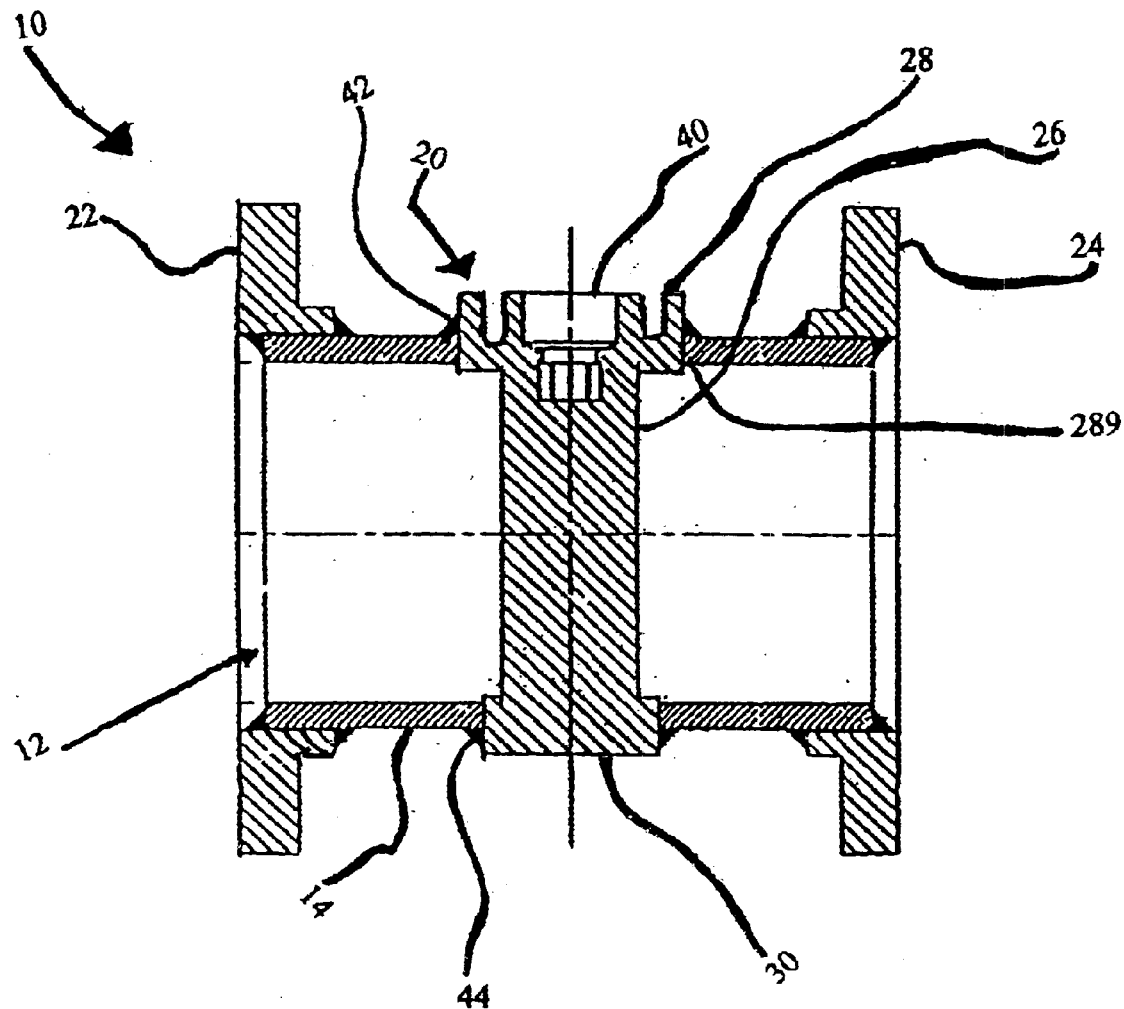
FIG. 1 is a diametrical cross-sectional view of a flow meter according to the invention and having a tubular passage with two opening therein to allow insertion of a vortex shedder therethrough such that the vortex shedder protrudes externally through each opening and is welded externally at each end to the wall of the tubular passage.
Figure 1A:
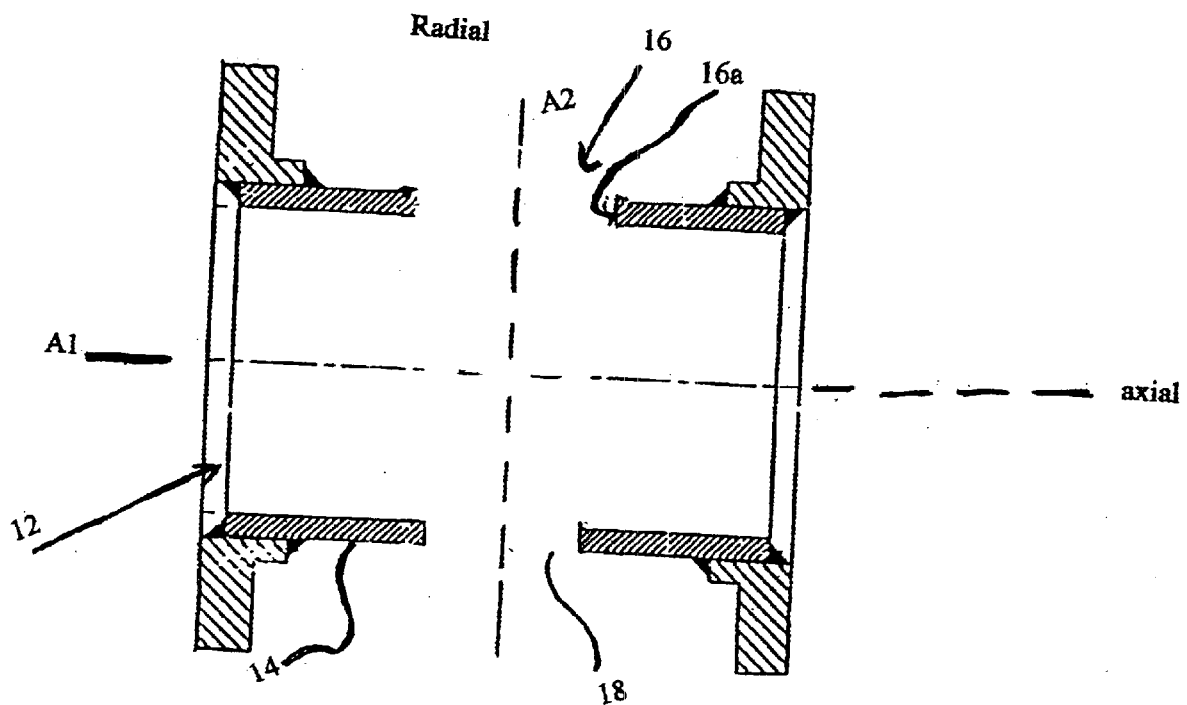
FIG. 1A is a cross-sectional view of a tubular passage, employed in the flow meter of FIG. 1, having two diametrically opposed openings therein to receive the vortex shedder of FIG. 1 therein.
Figure 1B:
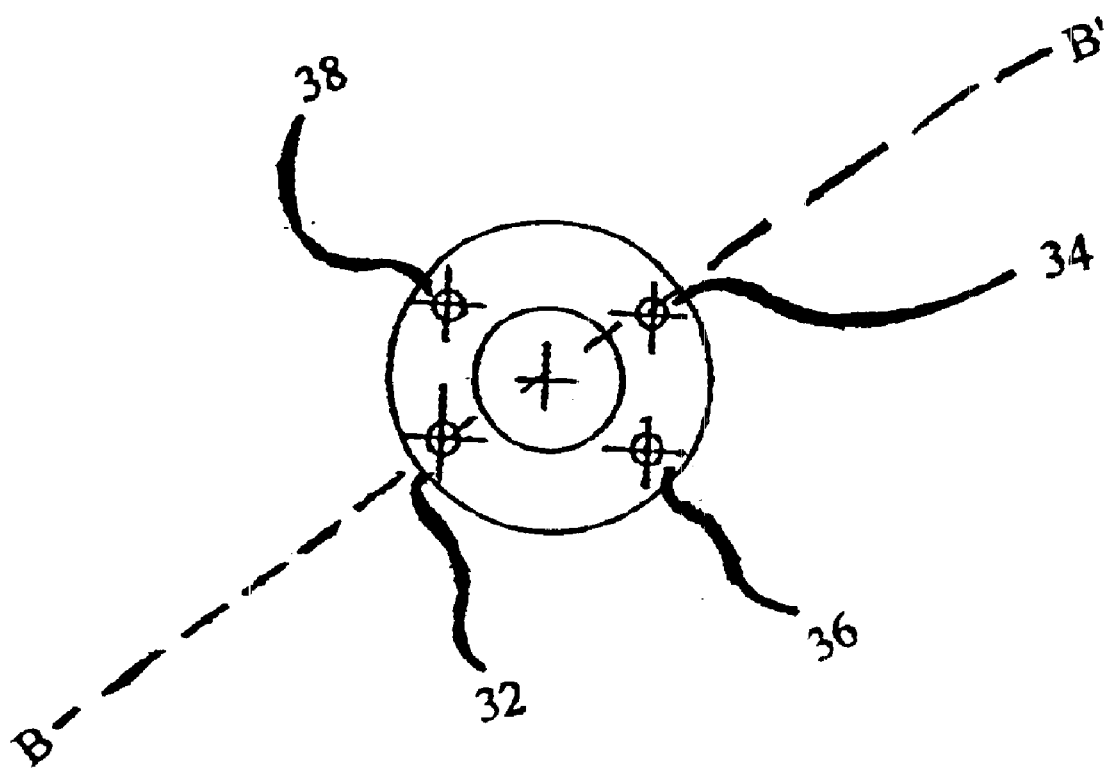
FIG. 1B is a top plan view of one mounting pad of the flow-meter vortex shedder of FIG. 1, illustrating four threaded holes for attaching a structure, such as a sensor, to the flow meter.

FIGS. 1, 1A, and 1B show that one vortex flow-meter 10 according to the invention has a conduit 12 with a wall 14 forming a passage for guiding a flowing fluid (not shown), herein referred to as process fluid, therethrough. The process fluid flows along an axial axis A1. The wall 14 includes two diametrically opposed openings 16 and 18, dimensioned to allow passage of a vortex-creating obstruction element 20 therethrough. The openings 16 and 18 are preferably disposed such that a radial axis A2 running through the centers of the openings 16 and 18 is perpendicular to the axial axis A1. The conduit 12 can be, for example, a stainless steel pipe that is cut to a desired length, and in which the openings 16 and 18 are produced. Two flanges 22 and 24, each connected to one end of the conduit, allow the flowmeter to mate with systems that receive and/or provide the process fluid.

The obstruction element 20 includes an elongate portion 26, and two mounting pads 28 and 30, each of which is preferably integrally connected to each end of the elongate portion 26. Reference to FIG. 1B, which is a top plan view of the mounting pad 28, illustrates that the mounting pad 28 includes four tapped holes 32, 34, 36, and 38 that allow mounting a sensor to the shedder 20. The elongate portion 26, shown in FIG. 1 that is a cross-sectional view along, the line BB' of FIG. 1B, is similar structurally to the elongate section of the vortex shedder disclosed in U.S. Pat. No. 4,220,046, herein incorporated by reference. In particular, the elongate portion 26 includes a blunt surface that faces the flowing fluid for inducing two streams of staggered vortices, and a tail portion for stabilizing the induced vortices. Unlike the elongate section of the vortex shedder of the '046 patent, the elongate portions 26 does not include a cavity for housing a sensor. Instead, as described above, the mounting pad 28 includes a cavity for accommodating a sensor, e.g., the sensor 46 of FIG. 1C, for detecting the induced vortices, thereby measuring velocity of the fluid flow.

One practice of the invention introduces the obstruction element 20 into the passage 12 such that the blunt surface of the obstruction element faces the flowing fluid, i.e., faces axially, and each mounting pad partially protrudes externally through the openings 16, and 18. An optional keying mechanism, such as a flat milled section on surface 28a of the mounting pad 28 and a corresponding milled surface 16a on the inner wall of the opening 16, can allow insertion of the shedder into the passage 12 only in the proper orientation, i.e., in an orientation in which the blunt surface of the shedder faces the flowing fluid. Further, insertion of the shedder into the passage 12 is such that the mounting pads 28 and 30 provide minimal interference with the flowing fluid, and the elongate section lies entirely within the flowing fluid.

The openings 16 and 18 are preferably externally beveled to allow full penetration welds 42 and 44 of each mounting pad to the external surface of the wall 14, to maintain the obstruction element 20 rigidly in the passage 12. The partial extrusion of the obstruction element 20 through the wall 14 also presents a number of advantages over conventional flowmeter designs that place the entire obstruction element within the passage 12. For example, the present flowmeter allows for thermal expansion of the obstruction element 20 without compensating for such thermal expansion by providing spacings between the obstruction element and the conduit 12. In addition, the present obstruction element can fit within a variety of conduits having different inner diameters, thus lowering the cost of manufacturing a vortex flowmeter. The obstruction element of the invention can also be installed directly into existing pipes. The flow meter of the invention advantageously transmits forces due to mechanical stress primarily to the main structural mass of the vortex shedder, rather than to the mounting pads and/or the attachment welds. Such distribution of stress forces further reduces the possibility of weld cracking, and concomitant loosening of the shedder bar.

Figure 1C:
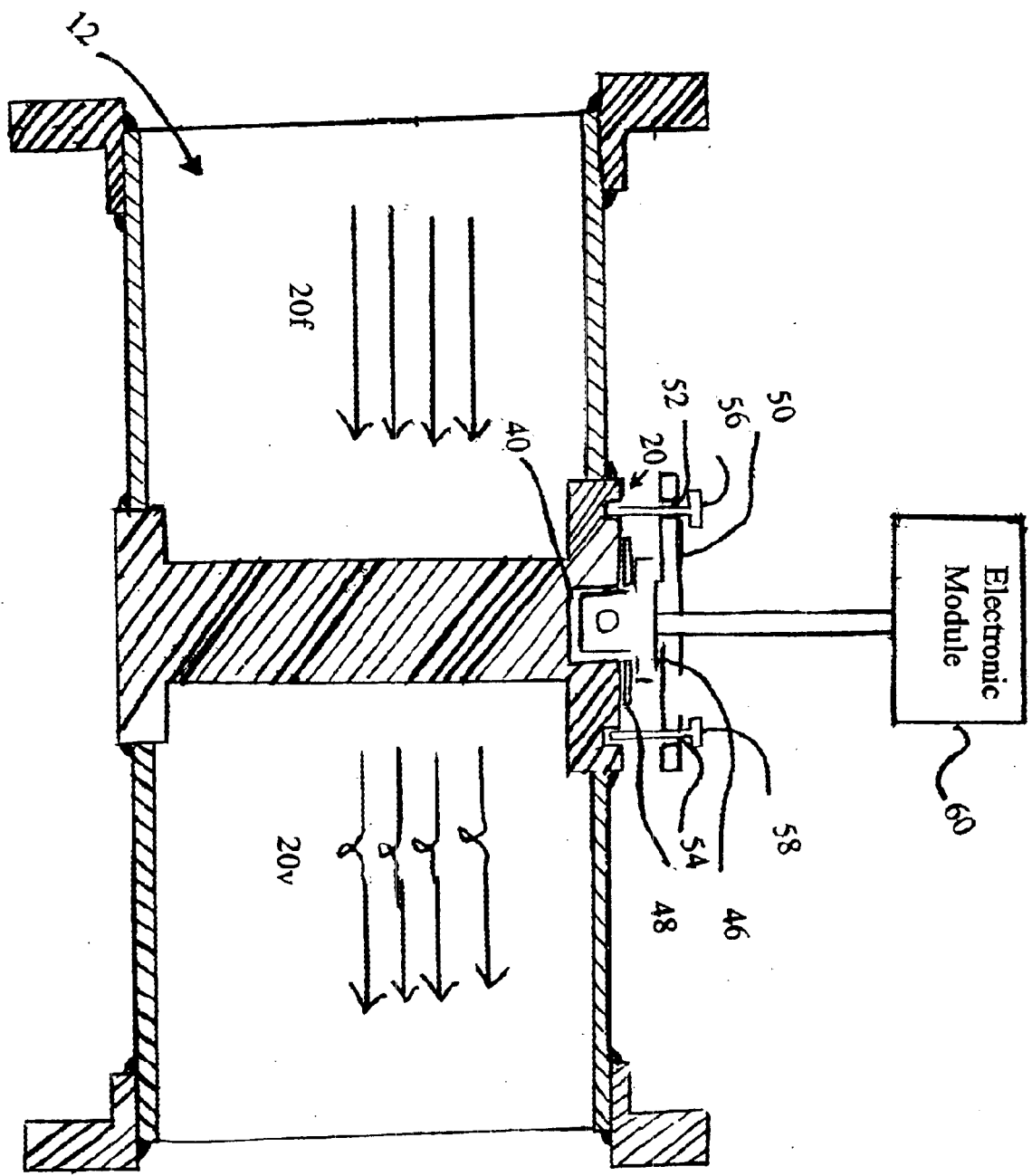
FIG. 1C is a diametrical cross-sectional view of another vortex flowmeter in accord with the teachings of the present invention and including a vortex shedder externally welded to the wall of pipe guiding the process fluid, for inducing vortices in the process fluid, a sensor for producing signals responsive to the vortices, and an electronic module electrically connected to the sensor for receiving the electrical signals for measuring flow velocity of the fluid.
Figure 1D:
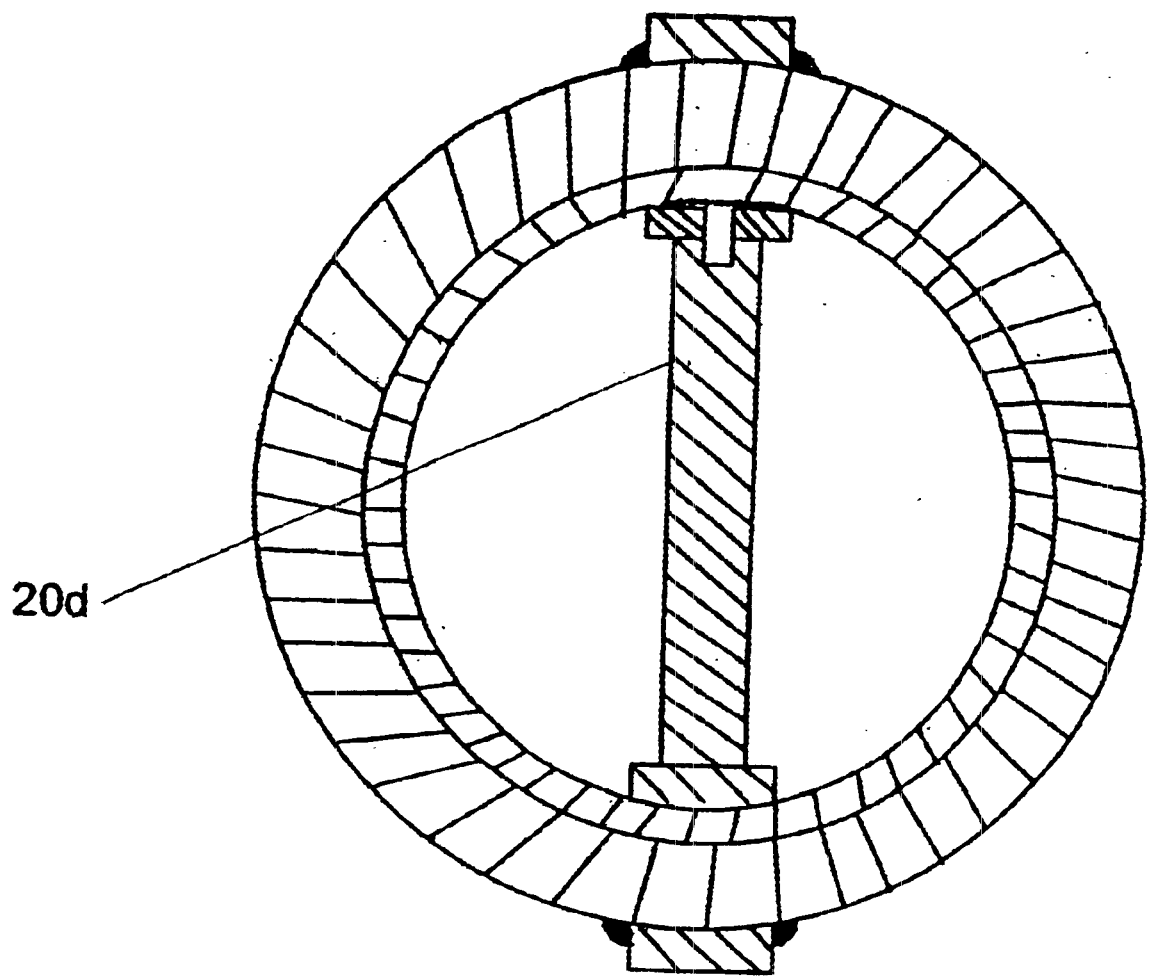
FIG. 1D is an axial cross-sectional view along the direction of fluid flow of the flowmeter of FIG. 1C, illustrating the blunt surface of the vortex shedder.

Referring to FIGS. 1C and 1D, a process fluid, indicated with arrows 20f, flowing through the passage 12 strikes a blunt face 20d of the obstruction element 20, thereby producing two streams of vortices, indicated with arrows 20v, that are staggered or otherwise offset with respect to each other. A sensor 46, seated in the housing 40 above a metal, such as copper, or non-metal, such as Teflon, gasket 48, detects the vortices. Various sensors for vortex flowmeters are known in the art. For example, one practice of the invention employs a sensor having two diaphragms facing each other and that transmit a pressure differential across the sensor to a piezoelectric transducer element. Each induced vortex corresponds to a localized area of low pressure. Because the set of induced vortices are staggered with respect to each other, the passage of a vortex over any of the two diaphragms produces a differential pressure across the sensor. This differential pressure causes the transducer element to produce an electrical signal, thereby indicating the passage of the vortex over the sensor. A bonnet 50 has four openings therein, two of which 52 and 54 are visible, that can be put in register with the tapped holes 32, 34, 36, and 38 of the mounting pad 28, shown in FIG. 1B. Four fasteners, such as screws or pin-like members, two of which 56 and 58 are visible, engage the bonnet 50 with the mounting pad 28, to allow the bonnet 50 to press against the sensor 46 and the gasket 48 to provide a seal between the sensor and the external environment.

An electronic module 60, which can be separate from the flow meter and connected to it electronically, receives the electrical signals produced by the sensor 46 for calculating the frequency of the vortices, thereby measuring the flow velocity of the fluid. Such electronic modules are known in the art. For example, a preferred embodiment of the invention utilizes an electronic module employed in a vortex flow meter marketed by The Foxboro Company, Foxboro, Mass. U.S.A ("Foxboro") under the trade designation 83.

Figure 2:
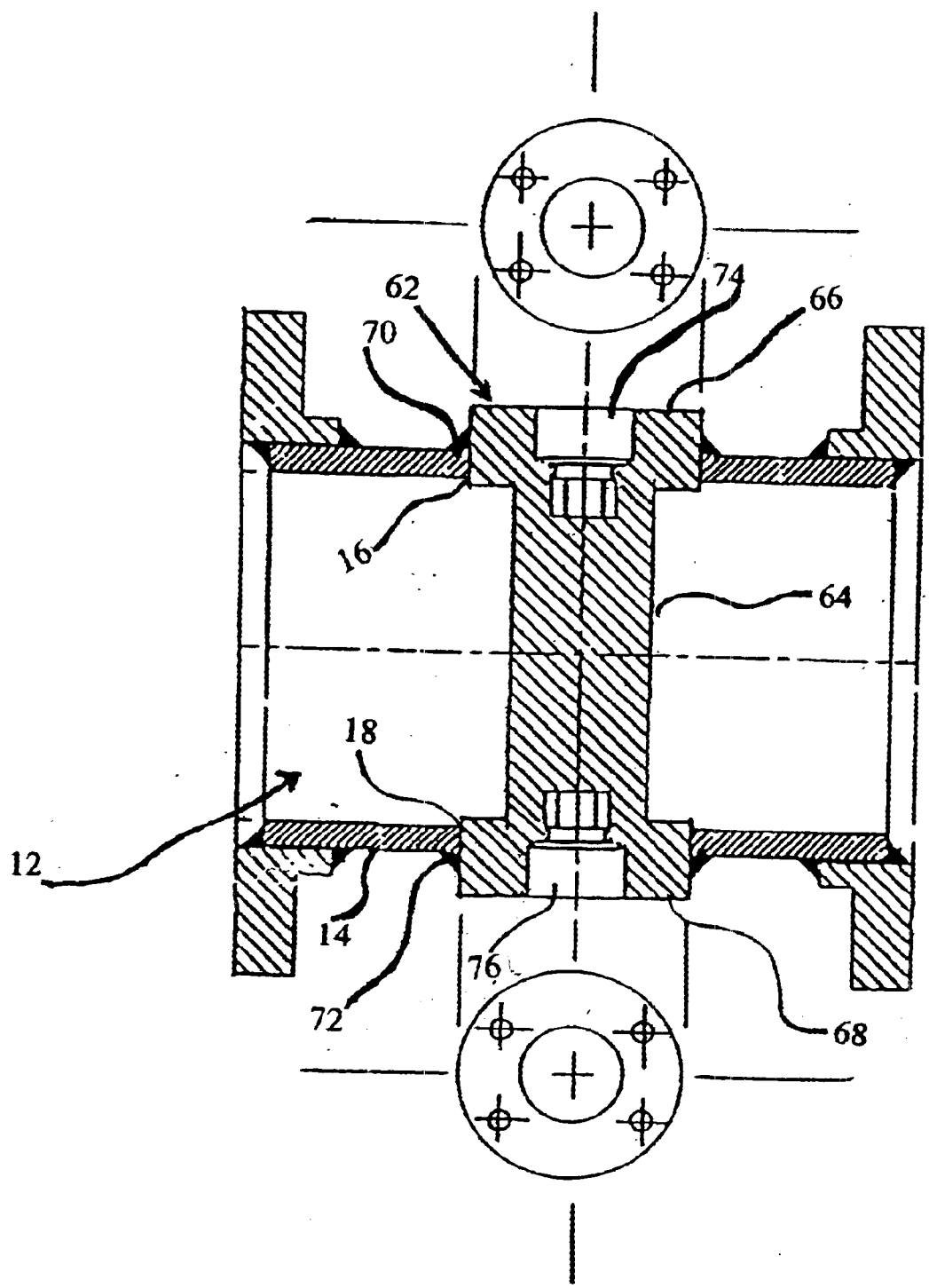
FIG. 2 is a diametrical cross-sectional view of a further flowmeter according to the invention with a vortex shedder having an elongate portion for inducing vortices in the process fluid, and two mounting pads integrally connected to the elongate portion, where each mounting pad has a cavity for housing a sensor therein.
Figure 2A:
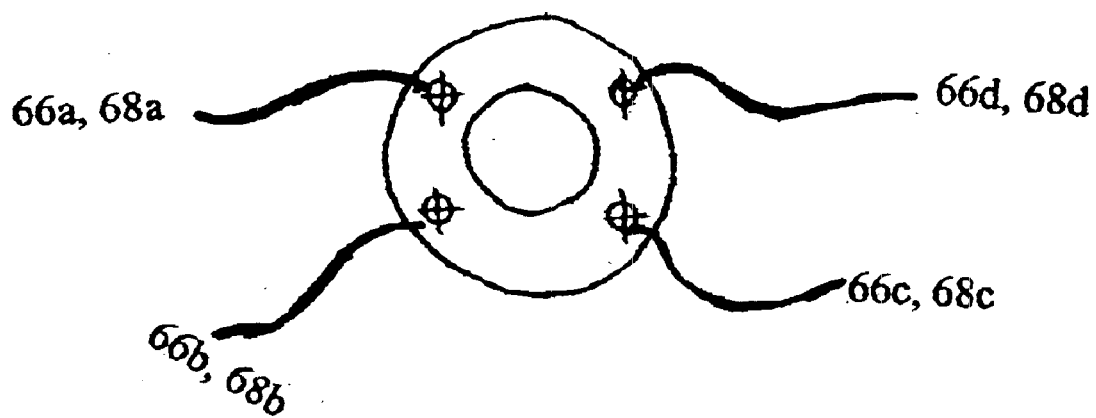
FIG. 2A is top plan view of the mounting pads of the vortex shedder of FIG. 2.

FIGS. 2 and 2A illustrate another embodiment of the present invention for measuring flow velocity of a fluid, in which a vortex-creating obstruction element 62 fits within a conduit 12 by insertion through openings 16, and 18. The obstruction element 62 includes an elongate portion 64 having a blunt surface, and two mounting pads 66 and 68, each of which is integrally connected to each end of the obstruction element 62. External welds 70 and 72 secure the mounting pads 66 and 68 to the external surface of the wall 14, thereby holding the obstruction element 62 rigidly in place within the conduit 12. The disposition of the obstruction element within the conduit 12 is such that the blunt surface of the obstruction element faces the flowing fluid, to induce two streams of spaced vortices within the fluid. The mounting pads 66 and 68 include cavities 74 and 76 therein, respectively. Each of the cavities 74 and 76 is machined to accommodate a sensor (not shown) for detecting the induced vortices within the flowing fluid, thereby measuring velocity of the fluid. Thus, the obstruction element 62 allows simultaneous use of two sensors. As shown in top plan views of the mounting pads 66 and 68 in FIG. 2A, the mounting pad 66 includes four tapped holes 66a, 66b, 66c, and 66d, and the mounting pad 68 includes four tapped holes 68a, 68b, 68c, and 68d to allow external attachment of other structures, such as an electronic module, to the vortex shedder 62.

Employing two sensors simultaneously, as shown in FIG. 2, provides a degree of redundancy that allows continued operation of the vortex flowmeter even if one sensor develops a fault and becomes non-functional. Another advantage of employing two sensors includes configuring a single vortex flow meter for use with different types of fluids, such as liquid and steam. Further, each sensor can be configured to be responsive to a particular range of flow rates, thus allowing the same vortex flow meter to measure flow rates in different extended ranges.

Figure 3:
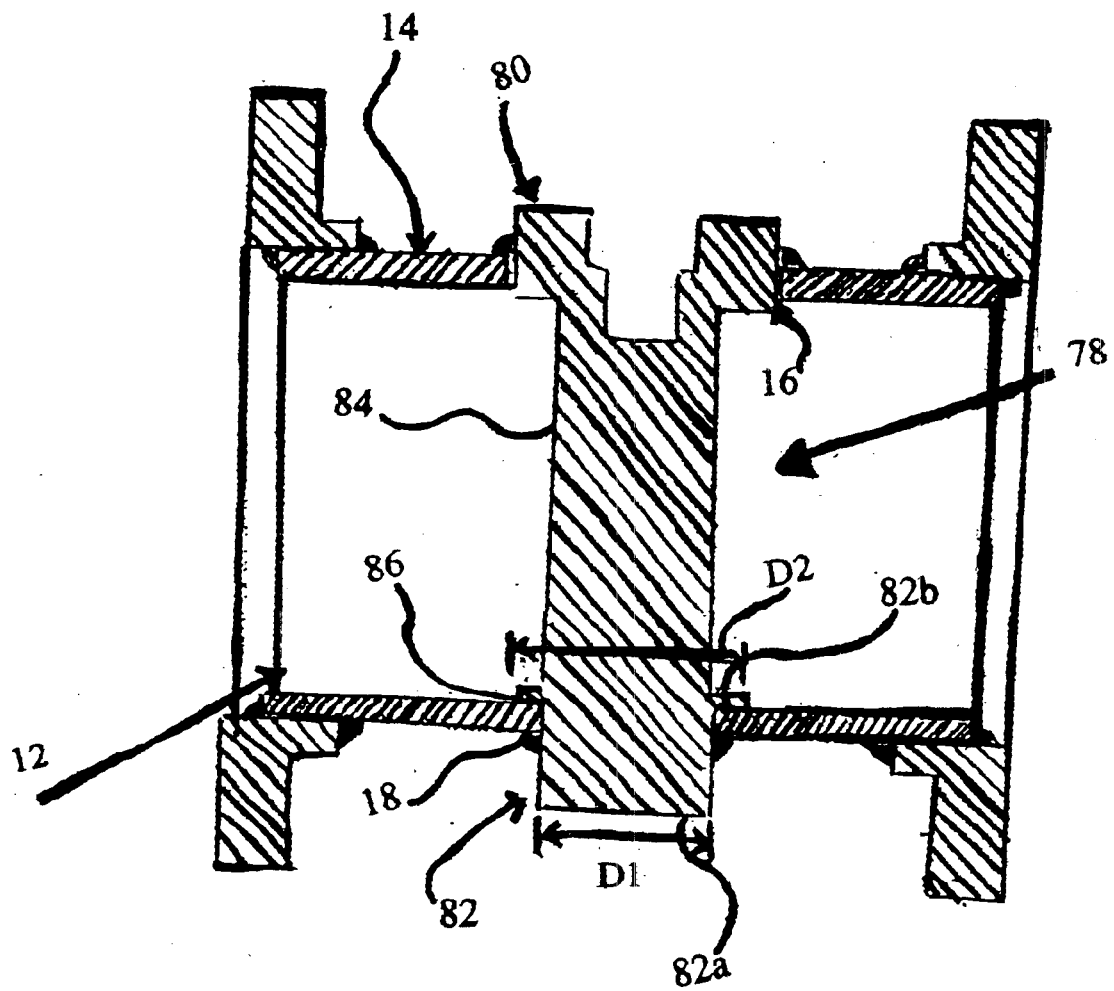
FIG. 3 is a diametrical cross-sectional view of another vortex shedder of the invention that includes a shedder having an elongate portion for inducing vortices in the process fluid, and two mounting pads integrally connected to the elongate portion, where one mounting pad has a cavity for seating a sensor, and the other mounting pad has a stepped diameter for providing a stoppage as the vortex shedder is inserted into the pipe.

One aspect of the present invention relates to positioning the vortex shedder within the fluid-guiding pipe such that the entire elongate portion of the shedder resides within the flowing fluid. FIG. 3 illustrates a preferred implementation of this aspect of the invention. In particular, a vortex shedder 78 having two mounting pads 80 and 82, and an elongate section 84 that is integrally connected to the mounting pads 80 and 82, is inserted through openings 16 and 18 into a pipe 12 having a wall 14. The opening 18 has a smaller diameter than the opening 16. The mounting pad 82 includes a portion 82a having a diameter D1, and a portion 82b having a diameter D2, where D2 is larger than D1. The diameters D1 and D2 are chosen such that both portions 82a and 82b can be inserted into the pipe 12 through the opening 16, but only the portion 82a passes through the opening 18. That is, the insertion of the vortex shedder 78 into the pipe 12 through the opening 16 proceeds until the portion 82a has passed through the opening 18. At this point, the portion 82b provides an interference with the inner surface of the wall 14 that prevents further insertion of the vortex shedder into the pipe 12. Thus, the stepped diameter of the mounting pad 82 advantageously provides a natural stoppage for insertion of the shedder, and allows precise and repeatable positioning of the elongate section of the shedder within the pipe 12.

Figure 3A:
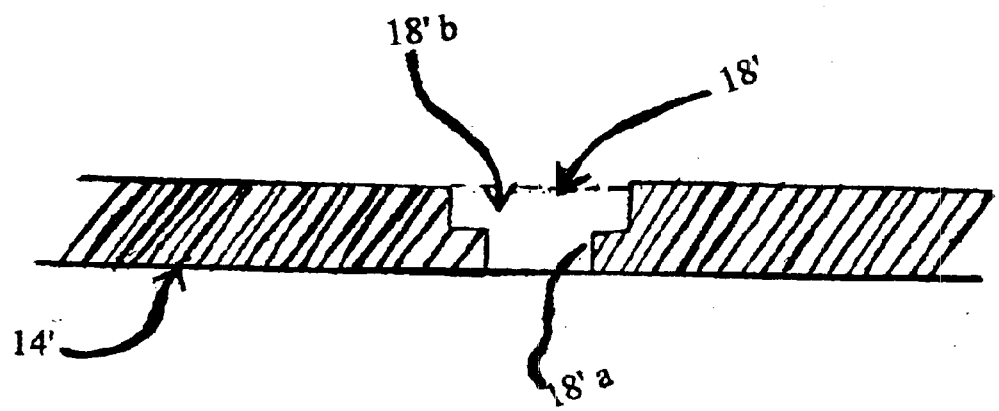
FIG. 3A is a fragmentary cross-sectional view of a wall of a vortex flowmeter according to the invention having a stepped opening in the wall.
Figure 3B:
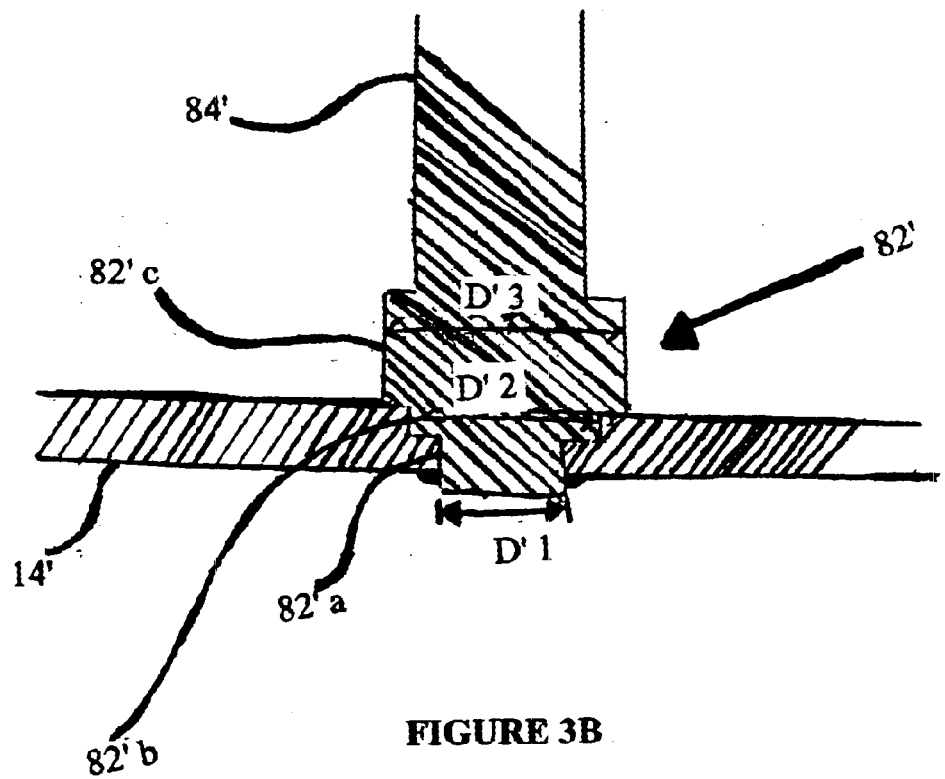
FIG. 3B is a fragmentary cross-sectional view of a mounting pad of a vortex shedder according to the invention adapted for engaging the stepped opening in the wall of the vortex flowmeter of FIG. 3A

FIG. 3A is a fragmentary view of a portion of a wall 14' of the fluid conduit of another embodiment of the invention having a stepped opening 18' therein. The stepped opening 18' includes a first portion 18'a and a second portion 18'b, and is configured to receive a mounting pad 82' of a vortex shedder 84', shown as a fragmentary view in FIG. 3B. The mounting pad 82' has a stepped structure that includes a portion 82' having a diameter D'1, a portion 82'b having a diameter D'2, and a portion 82'c having a diameter D'3, wherein D'3 is larger than D'2, and D'2 is larger than D'1. The first portion 18'a of the opening 18' is dimensioned to allow the passage of the portion 82'a of the mounting pad 82' therethrough, and to stop the portion 82'b of the mounting pad 82'. The second portion 18'b of the mounting pad 82' is dimensioned to allow the passage of the portions 82'a and 82b of the mounting pad 82' therethrough, and to stop the portion 82'c. Thus, the stepped structures of the mounting pad 82' and the opening 18' allow precise positioning of the vortex shedder 84' within a pipe, with the mounting pad 82' partially extruding through the opening 18'.

Figure 3C:
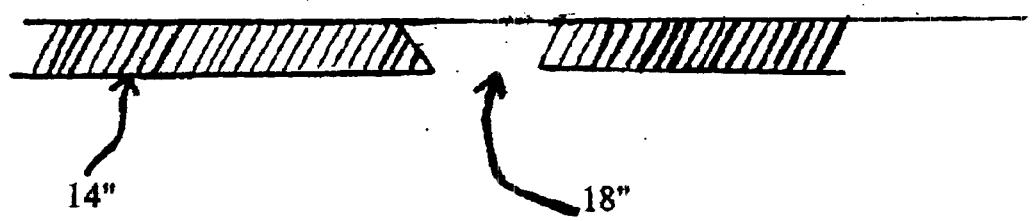
FIG. 3C is a fragmentary cross-sectional view of a wall of a vortex flowmeter according to the invention having a tapered opening therein.
Figure 3D:
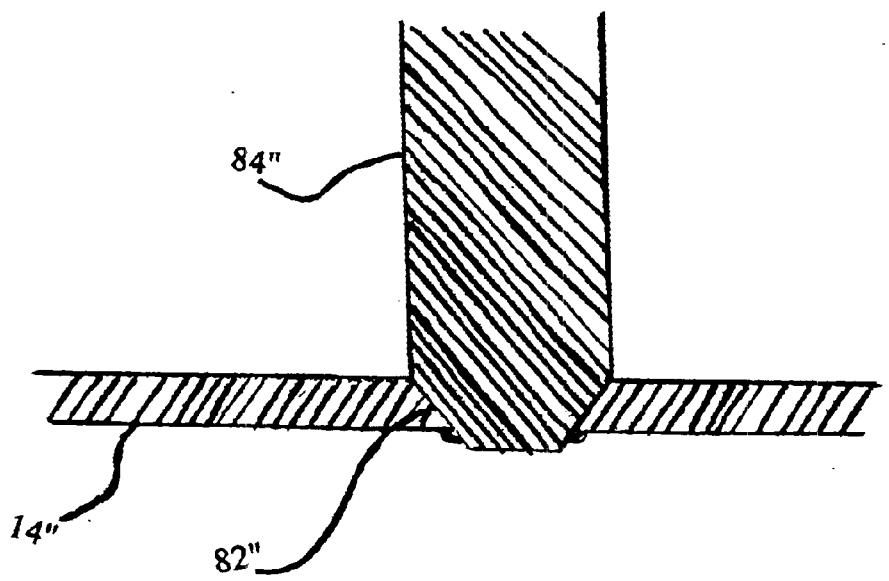
FIG. 3D is a fragmentary cross-sectional view of a mounting pad of a vortex shedder according to the invention having tapered surfaces adapted for engaging the tapered opening in the wall of the flowmeter of FIG. 3C to produce a stoppage for repeatable and precise positioning of the shedder within a fluid-guiding pipe.

Those skilled in the art will understand that structures for repeatable insertion of a vortex shedder of the invention within a pipe are not limited to the stepped structures described above. In particular, FIG. 3C shows a fragmentary view of a wall 14" of the fluid-conducting conduit of yet another embodiment of the present invention having therein an opening 18" with a flared inner wall. As shown in FIG.

3D, the opening 18" is configured for mating with a tapered mounting pad 82" of a vortex shedder 84" (shown as a fragmentary view) such that the mounting pad 82" protrudes partially externally through the opening 18". Other structures that include a combination of flared surfaces and stepped structures are within the scope of the present invention.

Figure 4:
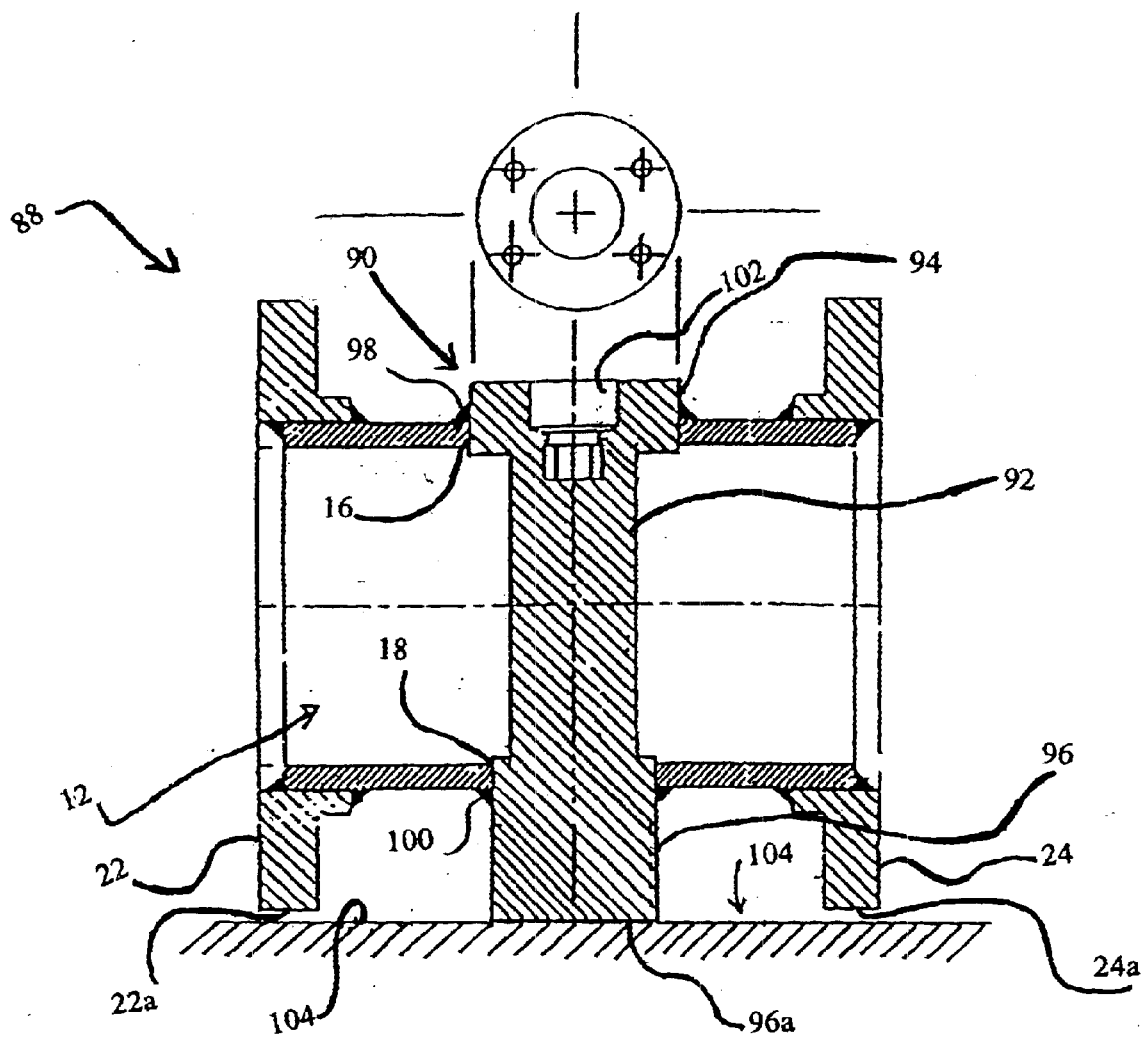
FIG. 4 is a diametrical cross-sectional view of yet another flow meter in accord with the teachings of the present invention having a vortex shedder that includes an elongate section, and two mounting pads, where one mounting pad includes a housing for a sensor, and the other mounting pad extends radially outward to support the flow meter on a flat surface in a stable fashion.

FIG. 4 illustrates another flowmeter 88 of the invention having an obstruction element 90 that includes an elongate portion 92, and two mounting pads 94 and 96. A preferred practice of the invention assembles the obstruction element 90 within the conduit 12 such that the elongate portion 92 fits entirely within the conduit 12, and the mounting pads 94 and 96 protrude externally through the openings 16 and 18, respectively. External welding joints 98 and 100 hold the obstruction element 90 rigidly in place. The mounting pad 94 includes a housing 102 for accommodating a sensor (not shown). The mounting pad 96 preferably protrudes through the opening 18, and radially extends outward such that its outer radial surface 96a extends radially beyond the outer radial surfaces 22a and 24a of the flanges 22 and 24. One advantage of the radial extension of the mounting pad 96 is that it allows resting the flowmeter 88 on a flat surface 104 in a stable fashion. Such stable disposition of the flowmeter 88 on the flat surface 104 facilitates assembly, fixturing, and/or handling of the flowmeter. This is a distinct advantage over conventional designs in which the flowtube can only roll on a surface.

Figure 5:
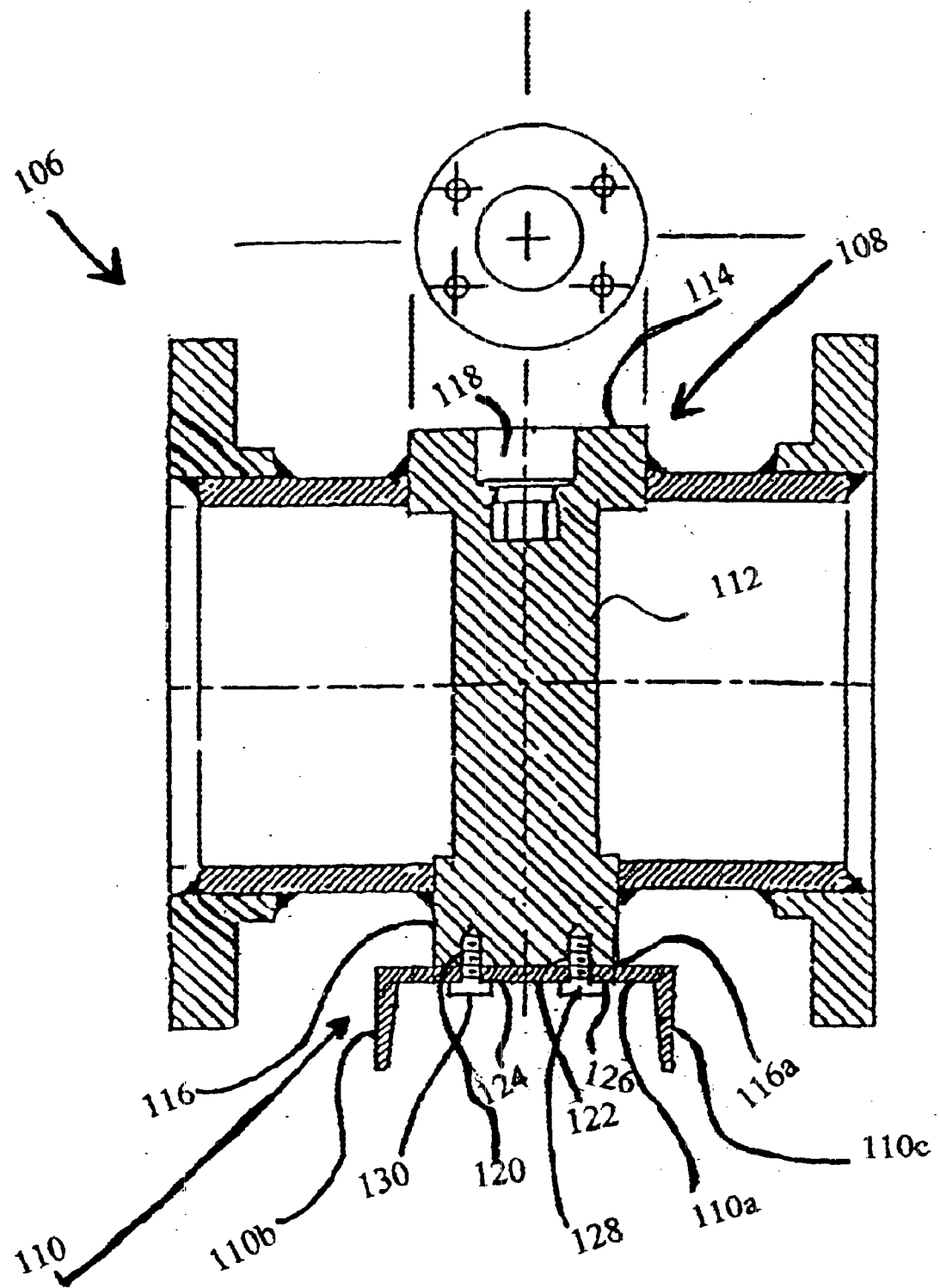
FIG. 5 illustrates a diametrical cross-sectional view of a further preferred embodiment of a flow meter according to the present invention having a vortex shedder positioned in a pipe for guiding the process fluid by extending through two openings in the wall of the pipe. The illustrated vortex shedder includes an elongate section, and two mounting pads integrally attached to the elongate section, and one mounting pad includes a housing for a sensor, and the other mounting pad includes threaded holes for attaching a structure for dampening vibrations thereto.

One practice of the present invention provides structures that are externally attached to the obstruction element for dampening vibrations of the piping system. FIG. 5 illustrates an exemplary flowmeter 106 according to the teachings of the present invention that includes a vortex-creating obstruction element 108 having an external structure 110 attached thereto. The obstruction element 108 includes an elongate section 112 for inducing vortices in a flowing fluid (not shown), and two mounting pads 114 and 116. The mounting pad 114 includes a housing 118 for accommodating a sensor (not shown) for detecting the induced vortices. The mounting pad 116 includes an outer radial surface 116a having two tapped holes 120, and 122 therein. The structural element 110 for dampening vibrations is attached to the outer radial surface 116a. The structural element 110 includes an axially extending section 110a having two openings 124 and 126 therein that can be put in register with the tapped holes 120 and 122, and two radially extending sections 110b and 110c, integrally connected to the axial section 110a. Two fasteners 128 and 130, such as screws, bolts, and the like, attach the structural element 110 to the obstruction element 112. Those skilled in the art will understand that the number of openings in the mounting pad 116 and the structural element 110 is not limited to two illustrated above. In particular, the mounting pad 116 and the structural element 110 can have any number of openings therein, to allow joining them together.

Conventional flowmeters typically do not include such structures for dampening vibrations, and instead rely on external piping supports, such U-bolts placed around the outer surface of the pipe, for minimizing vibrational effects. In contrast, the present invention allows precise positioning of a dampening structure. In particular, attaching the dampening structure directly to the vortex shedder can reduce mechanical stress on the shedder due to vibrations, thus preventing loosening of the shedder as a result of weld cracking.

Figure 6:
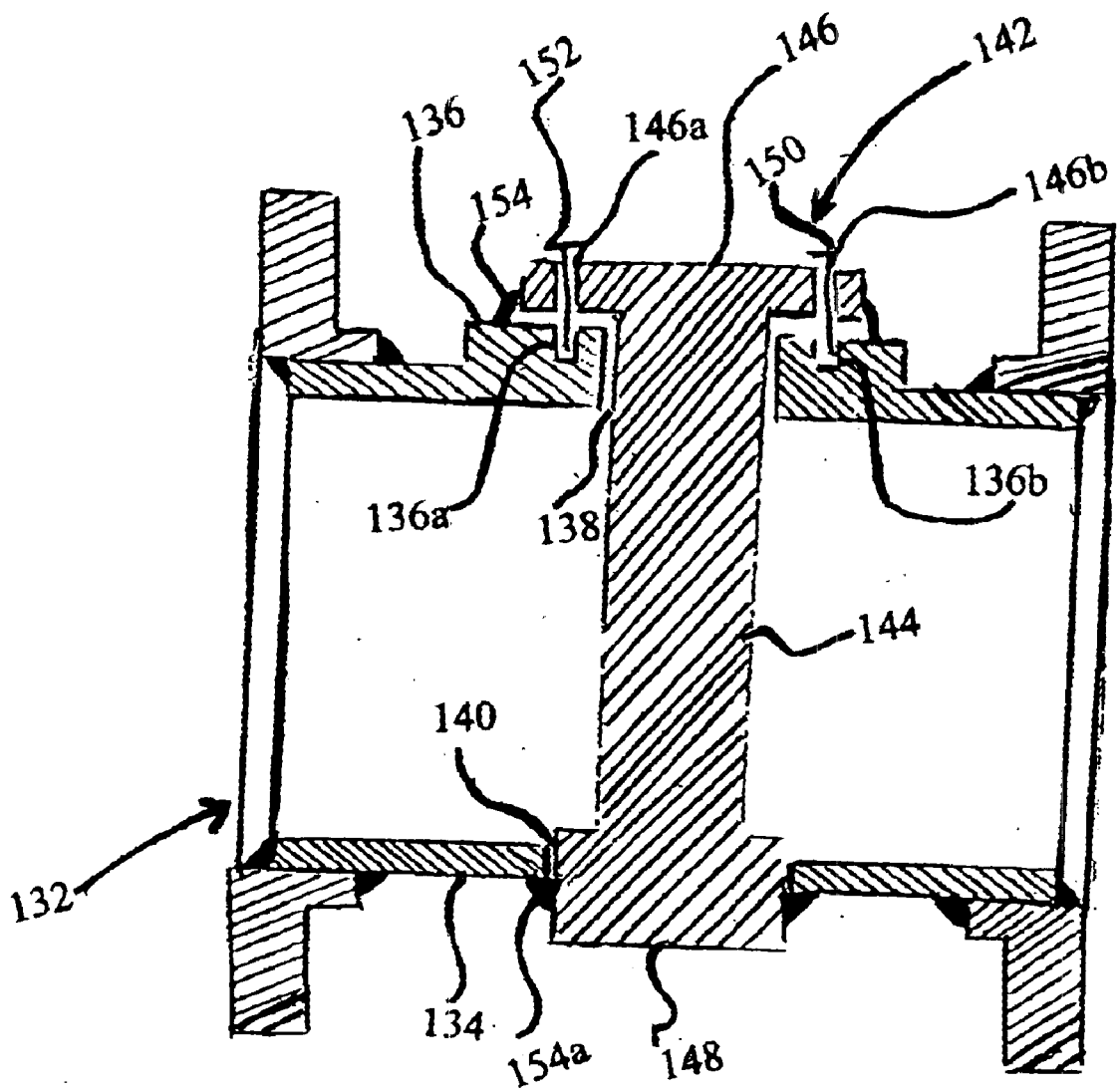
FIG. 6 illustrates a diametrical cross-sectional view of another flow meter according to teachings of the invention and that includes a vortex shedder disposed within a pipe for guiding the process fluid, where the vortex shedder includes an elongate section and two mounting pads integrally attached to the elongate section, and having a plurality of openings in one mounting pad to allow attachment of the shedder to a raised boss on the outside surface of the pipe.
Figure 6A:
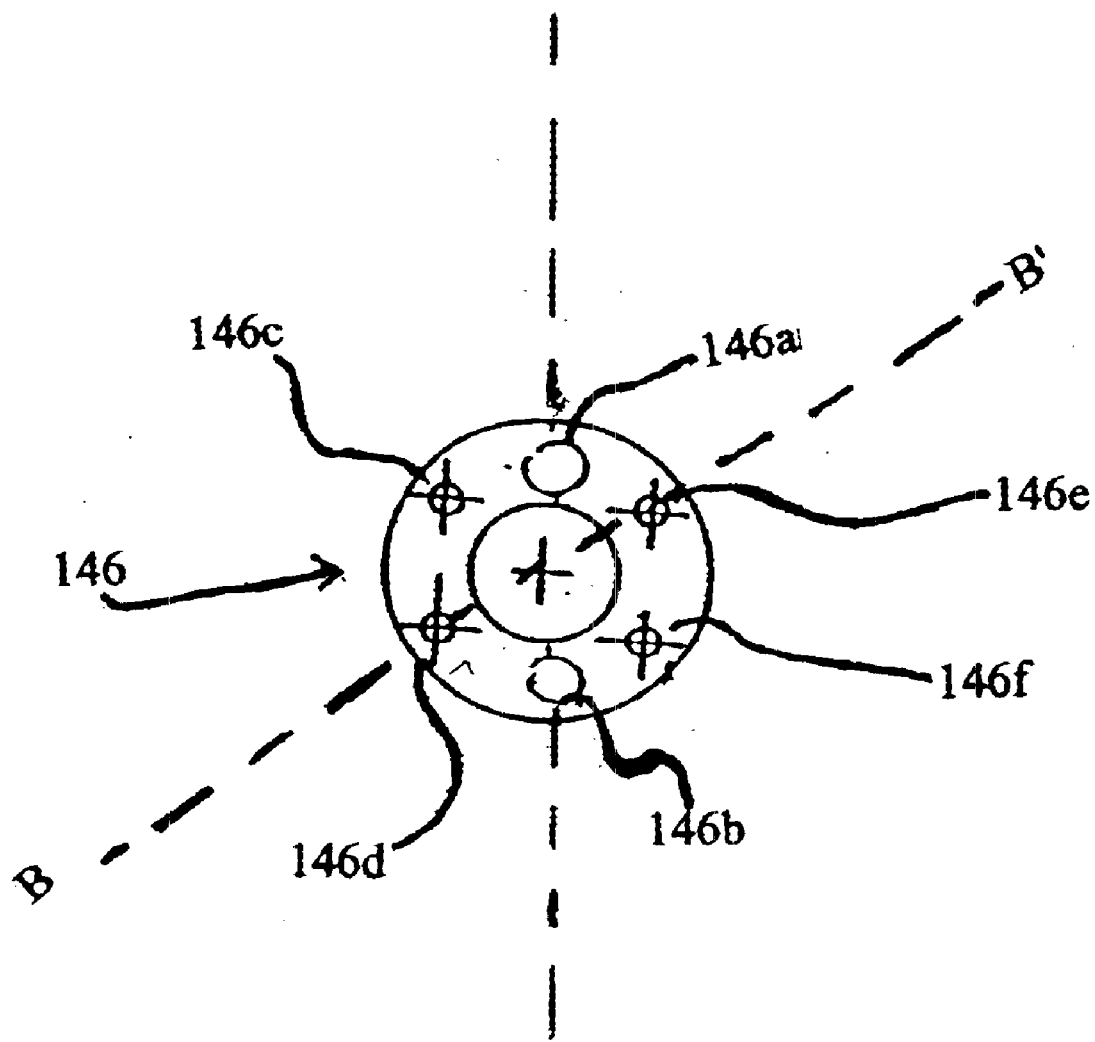
FIG. 6A is a top view one of the mounting pads of the vortex shedder of FIG. 6.

Another preferred practice of the invention attaches a vortex shedder spanning the entire diameter of a pipe and protruding through openings in the pipe to the external surface of the pipe not only by welding but also by employing a plurality of fasteners such as bolts, screws and the like. FIGS. 6 and 6A show this aspect of the invention by illustrating a tubular passage 132 formed by a wall 134 having a raised flat boss 136 that includes two threaded holes, 136a and 136b. The wall 134 further includes two diametrically opposed openings 138 and 140 that allow passage of a vortex shedder 142 therethrough. The vortex shedder 142 includes an elongate portion 144 integrally connected to two mounting pads 146 and 148. The mounting pad 146 contains two openings 146a and 146b that can be placed in register with the threaded holes 136a and 136b, and allow passage of fasteners 150 and 152, such as bolts or screws, therethrough. A top plan view of the mounting pad 146, as shown in FIG. 6A, illustrates that the mounting pad 146 also includes four threaded holes 146c, 146d, 146e, and 146f to allow its attachment to other structures, such as a sensor (not shown). In addition to the fasteners, a full penetration weld 154, as shown in FIG. 6, attaches the mounting pad 146 to the external surface of the wall 134. The opposed mounting pad 148 protrudes externally through the opening 140, and is attached to the external surface of the wall 134 by a full penetration weld 154a.

Attaching one or both of the mounting pads to the external wall of the pipe by fasteners advantageously provides easy alignment of the shedder within the fluid-guiding passage prior to welding the mounting pads to the external surface of the passage. In particular, placing the openings 146a, 146b, 146c, and 146d in register with the tapped holes 136a, 136b, 136c, and 136d ensures that the shedder is properly aligned within the passage 132. Further, employing fasteners, in addition to welding, provides extra structural support, and renders weld cracking, for example as a result of mechanical stress, less likely.

It will thus be seen that the invention efficiently attains the objects set forth above, including providing a vortex flow meter that is less costly to manufacture, and that is adaptable to a number of flowtube sizes. Since certain changes may be made in the above constructions and the described methods without departing from the scope of the invention. For example, shedder attachment does not require welding or bolting, but can instead use other securing mechanisms such as compression glands. Attaching the shedder without welding or bolting can ease extraction of the shedder for inspection, maintenance, cleaning, or inspection.

The integral shedder may be retrofitted to existing pipelines, for example, using clamp-on saddles. Such saddles may be attached by welding or clamped on using chain, wire rope, and so forth. This allows retrofit by simple holes being made in the pipeline. The shedder is inserted into the saddles and secured to the clamp. The integral shedder bar can include all the details for attachment of the sensor, electronics, and so forth required to complete vortex shedding flow measurement within a pipe. This would be particularly useful for large existing pipelines where a separate metering section would be uneconomical.

It is intended that all matter contained in the above description or shown in the accompanying drawings be interpreted as illustrative and not in a limiting sense.

What is claimed as new and protected by Letters Patent is:

1. A vortex sensing apparatus for producing at least one electrical signal based on a flow velocity of a fluid, the vortex sensing apparatus comprising a conduit having a wall forming a passage for guiding said fluid, said wall having inner and outer surfaces and first and second openings extending from said inner surface to said outer surface, said first and second openings at opposite ends of a chord of said wall cross-section,
a vortex-creating obstruction element including
an elongate portion with first and second ends,
a first mounting pad integrally connected to said first end,
a second mounting pad integrally connected to said second end,
wherein said obstruction element is disposed in said passage with said first mounting pad extending through said first opening at least partially externally of said outer surface,
wherein said obstruction element is disposed in said passage with said second mounting pad extending through said second opening at least partially externally of said outer surface, and
wherein said elongate portion obstructs said flowing fluid to produce a stream of vortices, and
a sensor on said obstruction element for producing at least one electrical signal based on said vortices.

2. The vortex sensing apparatus of claim 1, further comprising a fastener attaching said obstruction element to said conduit by securing at least one of said first and second mounting pads externally of said outer surface to said conduit wall.

3. The vortex sensing apparatus of claim 2, wherein said fastener comprises a spot weld.

4. The vortex sensing apparatus of claim 2, wherein said fastener comprises a full penetration weld.

5. The vortex sensing apparatus of claim 1, further including a cavity recessing at least one of said first and second mounting pads in a direction of said elongate portion for seatingly mounting said sensor.

6. The vortex sensing apparatus of claim 1, further comprising an electronic module electrically connected to said sensor to receive said electrical signals for measuring flow velocity of the fluid.

7. A vortex-producing element for creating a stream of vortices in a flowing fluid guided trough a passage formed by a conduit having a wall with inner and outer surfaces and first and second openings extending from said inner surface to said outer surface, said first and second openings at opposite ends of a chord of said wall cross-section, said element comprising
an elongate portion for producing said stream of vortices when disposed in said flowing fluid, said elongate portion having first and second ends,
a first mounting pad integrally connected to said first end of said elongate portion, and
a second mounting pad integrally connected to said second end of said elongate portion,
wherein said first mounting pad is configured to extend through said first opening at least partially externally of said outer surface when said elongate portion is disposed within said passage, said first mounting pad having a first dimension along a direction of said elongate portion greater than a thickness of said conduit wall, and
wherein said second mounting pad is configured to extend through said second opening at least partially externally of said outer surface when said elongate portion is disposed within said passage, said second mounting pad having a second dimension along a direction of said elongate portion greater than a thickness of said conduit wall.

8. The vortex-producing element of claims 7, wherein at least one of said first and second mounting pads includes a tapered portion for providing a stop when said elongate portion is disposed within said fluid-guiding passage.

9. The vortex-producing element of claim 7, wherein at least one of said first and second mounting pads includes a stepped portion for producing a stop when said elongate portion is disposed within said fluid-guiding passage.

10. The vortex-producing element of claim 9, wherein said stepped portion includes a first section integrally connected to said elongate portion and having a circular cross section with a first diameter, and a second section integrally connected to said first section and having a circular cross-section with a second diameter, wherein said first diameter is larger than said second diameter.

11. A vortex sensing apparatus for producing at least one electrical signal based on a flow velocity of a fluid, the vortex sensing apparatus comprising
a conduit having a wall forming a passage for guiding said fluid, said wall having inner and outer surfaces and first and second openings extending from said inner surface to said outer surface, said first and second openings at opposite ends of a chord of said wall cross-section,
a vortex shedder including
an elongate portion with first and second ends,
a first mounting pad integrally attached to said first end of said elongate portion and having a first mounting pad dimension in a direction of said elongate portion larger than a thickness of said conduit wall, and
a second mounting pad integrally attached to said second end of said elongate portion and having a second mounting pad dimension in a direction of said elongate portion larger than a thickness of said conduit wall,
wherein said elongate portion and said first and second mounting pads are sized to fit within said first and second openings to allow said obstruction element to be disposed in said conduit by seating said mounting pads in said first and second openings,
wherein said first mounting pad extends at least partially externally of said outer surface through said first opening,
wherein said second mounting pad extends at least partially externally of said outer surface through said second opening, and
wherein said elongate portion partially obstructs said flowing fluid to produce a stream of vortices, and
a sensor on said vortex shedder for producing at least one electrical signal based on said vortices.

12. The vortex sensing apparatus of claim 11, wherein said first and second openings have circular cross sections of dimension A1, said elongate portion has a maximum cross-sectional dimension A2 less than A1, and said mounting pads have circular cross-sectional dimension A3, wherein A3 is larger than or equal to A2 and A3 is less than A1.

13. The vortex sensing apparatus of claim 11, wherein at least one of said first and second mounting pads includes an attachment structure for securing a member for dampening vibrations externally to said vortex shedder.

14. The vortex sensing apparatus of claim 13, wherein said attachment structure includes at least a threaded hole for engaging said member for dampening vibrations.

15. The vortex sensing apparatus of claim 14, wherein said member for dampening vibrations includes an axial portion having at least an opening therein to be put in register with said threaded hole for attaching said member to said vortex shedder by inserting a fastener through said opening into said threaded hole, and two radial portions integrally connected to each end of said axial portion.

16. A vortex sensing apparatus for producing at least one electrical signal based on a flow velocity of a fluid, the vortex sensing apparatus comprising a conduit having a wall forming a passage for guiding said fluid, said wall having inner and outer surfaces and first and second openings extending from said inner surface to said outer surface, said first opening being larger than said second opening, said first opening and said second opening at opposite ends of a chord of said wall cross section, a vortex shedder including
an elongate portion with first and second ends,
a first mounting pad integrally connected to said first end and,
a second mounting pad integrally connected to said second end,
wherein said first mounting pad is smaller than said first opening and larger than said second opening and has a cavity therein along a direction of said elongate portion,
wherein said second mounting pad is smaller than said first and second openings,
wherein said first mounting pad extends at least partially externally of said outer surface through said first opening,
wherein said second mounting pad extends at least partially externally of said outer surface through said second opening, and a sensor seatingly mounted in said cavity and producing at least one electrical signal based on said vortices.

17. The vortex sensing apparatus of claim 16, wherein said first opening has a circular diameter A1, said second opening has a circular diameter A2, said first mounting pad has a circular cross section of diameter D1, and said second mounting pad has a circular cross section of diameter D2, wherein A1 is larger than A2, D1 is smaller than A1 and larger than A2, and D2 is smaller than A1 and A2.

18. A method for measuring a flow velocity of a fluid guided through a conduit having a wall with inner and outer surfaces and first and second diametrically opposed openings extending from said inner surface to said outer surface, said method comprising disposing a vortex shedder in said flowing fluid for producing a stream of spaced-apart vortices, said vortex shedder having first and second spaced-apart mounting pads and an elongate portion spanning therebetween, wherein said first mounting pad extends at least partially externally of said outer surface through said fit opening, wherein said second mounting pad extends at least partially externally of said outer surface through said second opening, and said elongate portion produces said vortices when said vortex shedder is disposed in said flowing fluid, and producing at least one electrical signal based on said vortices.

* * * * *